(12) United States Patent
Nakasugi et al.

(10) Patent No.: US 8,403,387 B2
(45) Date of Patent: Mar. 26, 2013

(54) GRIPPING APPARATUS, ROBOT SYSTEM AND GRIPPING METHOD

(75) Inventors: Mikio Nakasugi, Tama (JP); Yoshiyuki Miyazaki, Yokohama (JP); Akiyoshi Yokoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/153,517

(22) Filed: Jun. 6, 2011

(65) Prior Publication Data

US 2012/0007374 A1   Jan. 12, 2012

(30) Foreign Application Priority Data

Jul. 6, 2010 (JP) .................................. 2010-153682

(51) Int. Cl.
*B25J 15/08*   (2006.01)
(52) U.S. Cl. ............... 294/2; 294/86.4; 901/31; 269/900
(58) Field of Classification Search .................. 294/106, 294/111, 2, 86.4, 103.1, 207, 119.1; 269/34, 269/118, 155, 900; 414/729, 739
See application file for complete search history.

(56) References Cited

U.S. PATENT DOCUMENTS

| | | | | |
|---|---|---|---|---|
| 3,069,761 | A | * | 12/1962 | Sommer .......................... 29/252 |
| 3,202,449 | A | * | 8/1965 | Lemelson ...................... 294/198 |
| 4,273,506 | A | * | 6/1981 | Thomson et al. ............. 414/735 |
| 4,623,183 | A | * | 11/1986 | Aomori ......................... 294/86.4 |
| 4,636,135 | A | * | 1/1987 | Bancon .......................... 414/730 |
| 4,815,780 | A | * | 3/1989 | Obrist ........................... 294/86.4 |
| 5,378,033 | A | * | 1/1995 | Guo et al. ...................... 294/116 |
| 7,370,896 | B2 | * | 5/2008 | Anderson et al. ............. 294/106 |
| 2010/0171332 | A1 | * | 7/2010 | Geary et al. .................... 294/88 |

FOREIGN PATENT DOCUMENTS

JP   09-029675 A   2/1997

\* cited by examiner

*Primary Examiner* — Paul T Chin
(74) *Attorney, Agent, or Firm* — Fitzpatrick, Cella, Harper & Scinto

(57) ABSTRACT

A gripping apparatus includes a palm and a plurality of fingers having joints to grip a tool with the palm and the plurality of fingers. A palm side contact surface is provided on the palm and brought into contact with a tool side contact surface of the tool, and holes are provided in the palm side contact surface into which projections provided on the tool side contact surface of the tool can be inserted. Engagement of the projections in the holes determines a position of the tool in a tangential direction of the palm side contact surface and a position of the tool in a rotational direction around a normal line of the palm side contact surface which is a rotary shaft center.

6 Claims, 5 Drawing Sheets

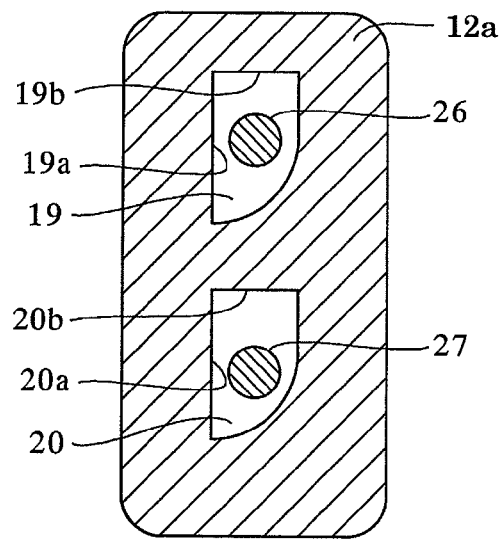 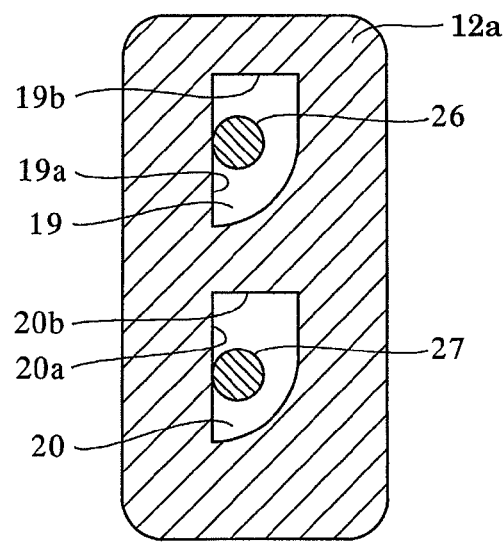
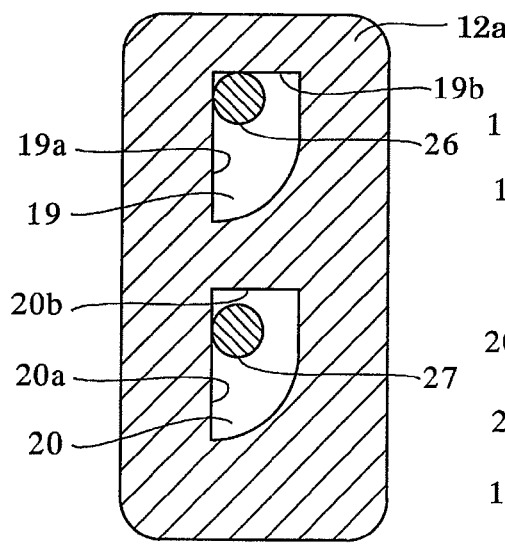 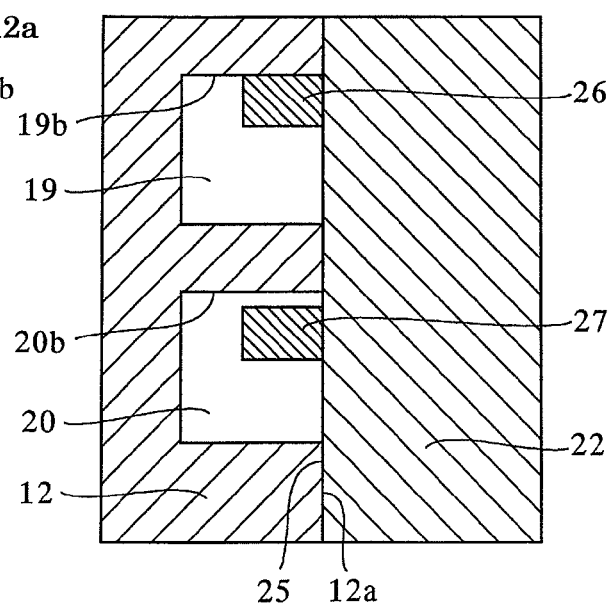

GRIPPING APPARATUS, ROBOT SYSTEM AND GRIPPING METHOD

BACKGROUND OF THE INVENTION

1. Field of the Invention

The present invention relates to a gripping apparatus mounted on an arm of a robot, a robot system including a robot having a gripping apparatus, and a gripping method in which a gripping apparatus grips a gripping object.

2. Description of the Related Art

Heretofore, a robot system including a robot having a gripping apparatus has been known. In recent years, there has been demanded a robot system which realizes a manual assembling operation by a robot. Moreover, in the manual assembling operation, conveyors are removed, and a person cell production system is introduced in which persons directly convey workpieces, but for the purpose of replacing person cells with robot cells, a robot system is demanded which grips various parts to perform the assembling operation. Moreover, a robot system is demanded in which a robot performs an assembling operation by use of an assembling tool and an assembling jig such as a screwdriver and a dispenser, whereby the robot can perform the operation in the same manner as in person. In this case, it is necessary to grip various assembling tools.

At this time, in order to precisely perform the assembling operation, it is required to set a positioning reproduction precision to a high precision in a case where the gripping apparatus grips a gripping object such as the assembling tool. That is, every time the workpiece is changed, the robot repeats the same operation. Therefore, the gripping apparatus needs to repeat a similar gripping operation. In this case, it is required that the positioning reproducibility of the gripping object is improved to precisely position the gripping object. In particular, it is necessary to precisely position a gripping object such as the assembling tool at an operating position (a bit tip in the case of the screwdriver and a needle tip in the case of the dispenser). On the other hand, heretofore there has been suggested a gripping apparatus including a palm having a V-shaped guide groove which guides the gripping object to regulate a posture thereof when gripping the gripping object (see Japanese Patent Application Laid-Open No. H09-029675).

However, in the above conventional gripping apparatus, the posture of the gripping object can be regulated, but a direction of the gripping object along the guide groove is not regulated, whereby it is not possible to precisely position the gripping object. When the gripping object is a tool such as the screwdriver, the tool is not positioned in a longitudinal direction. Therefore, the tip of the tool cannot precisely be positioned with respect to the workpiece.

To solve the problem, an object of the present invention is to provide a gripping apparatus which improves a positioning reproducibility of a gripping object when gripping the gripping object, whereby the gripping object can precisely be positioned, and to provide a robot system and a gripping method.

SUMMARY OF THE INVENTION

According to the present invention, there is provided a gripping apparatus which includes a palm and a plurality of fingers having joints to grip a gripping object with the palm and the plurality of fingers, comprising a palm side contact surface provided on the palm and brought into contact with a gripping object side contact surface of the gripping object, characterized in that the palm side contact surface is provided with holes into which projections provided on the gripping object side contact surface of the gripping object are inserted, to determine a position of the gripping object in a tangential direction of the palm side contact surface and a position of the gripping object in a rotational direction around a normal line of the palm side contact surface which is a rotary shaft center.

Moreover, according to the present invention, there is provided a robot system comprising a robot including the above gripping apparatus, and a tool having a tool main body to which an attachment member is attached, characterized in that the attachment member has the gripping object side contact surface provided with the projections and brought into contact with the palm side contact surface of the gripping apparatus.

Furthermore, according to the present invention, there is provided a gripping method in which a gripping apparatus including a palm having a palm side contact surface and a plurality of fingers having joints grips a gripping object, the palm side contact surface of the palm being provided with holes into which projections provided on a gripping object side contact surface of the gripping object are detachably inserted, the holes having reference surfaces formed on side walls thereof, the gripping method characterized by comprising: a positioning step of inserting the projections into the holes and attaching the projections onto the reference surfaces to position the gripping object; and a gripping step of pressing the gripping object side contact surface of the gripping object onto the palm side contact surface of the palm with the plurality of fingers to grip the gripping object in a state where the gripping object is positioned in the positioning step.

According to the present invention, the gripping apparatus has the palm side contact surface brought into contact with the gripping object side contact surface, and the holes are configured to determine the position of the gripping object in the tangential direction of the palm side contact surface and the position of the gripping object in the rotational direction around the normal line of the palm side contact surface which is the rotary shaft center. Therefore, a reproduction precision of the positioning of the gripping object can be improved, and the gripping object can precisely be positioned.

Moreover, according to the robot system of the present invention, the reproduction precision of the positioning of the tool can be improved, and the tool can precisely be positioned. In consequence, the robot can securely perform an operation by use of the tool.

Furthermore, according to the gripping method of the present invention, after attaching the projections of the gripping object onto the reference surfaces of the holes of the palm, the gripping object side contact surface of the gripping object is pressed onto the palm side contact surface of the palm. In consequence, the reproduction precision of the positioning of the gripping object improves, and the gripping object is precisely positioned.

Further features of the present invention will become apparent from the following description of exemplary embodiments with reference to the attached drawings.

BRIEF DESCRIPTION OF THE DRAWINGS

FIG. 4A is an exemplary diagram illustrating a state where projections are inserted into holes in a gripping method by the gripping apparatus according to the second embodiment of the present invention.

FIG. 4B is an exemplary diagram illustrating a state where the projections are attached onto parallel reference surfaces in the gripping method by the gripping apparatus according to the second embodiment of the present invention.

FIG. 4C is an exemplary diagram illustrating a state where the projections are attached onto vertical reference surfaces in the gripping method by the gripping apparatus according to the second embodiment of the present invention.

FIG. 4D is an exemplary sectional view illustrating a contact state between the palm and the attachment member in the gripping method by the gripping apparatus according to the second embodiment of the present invention.

DESCRIPTION OF THE EMBODIMENTS

Preferred embodiments of the present invention will now be described in detail in accordance with the accompanying drawings.

First Embodiment

Figure 1:
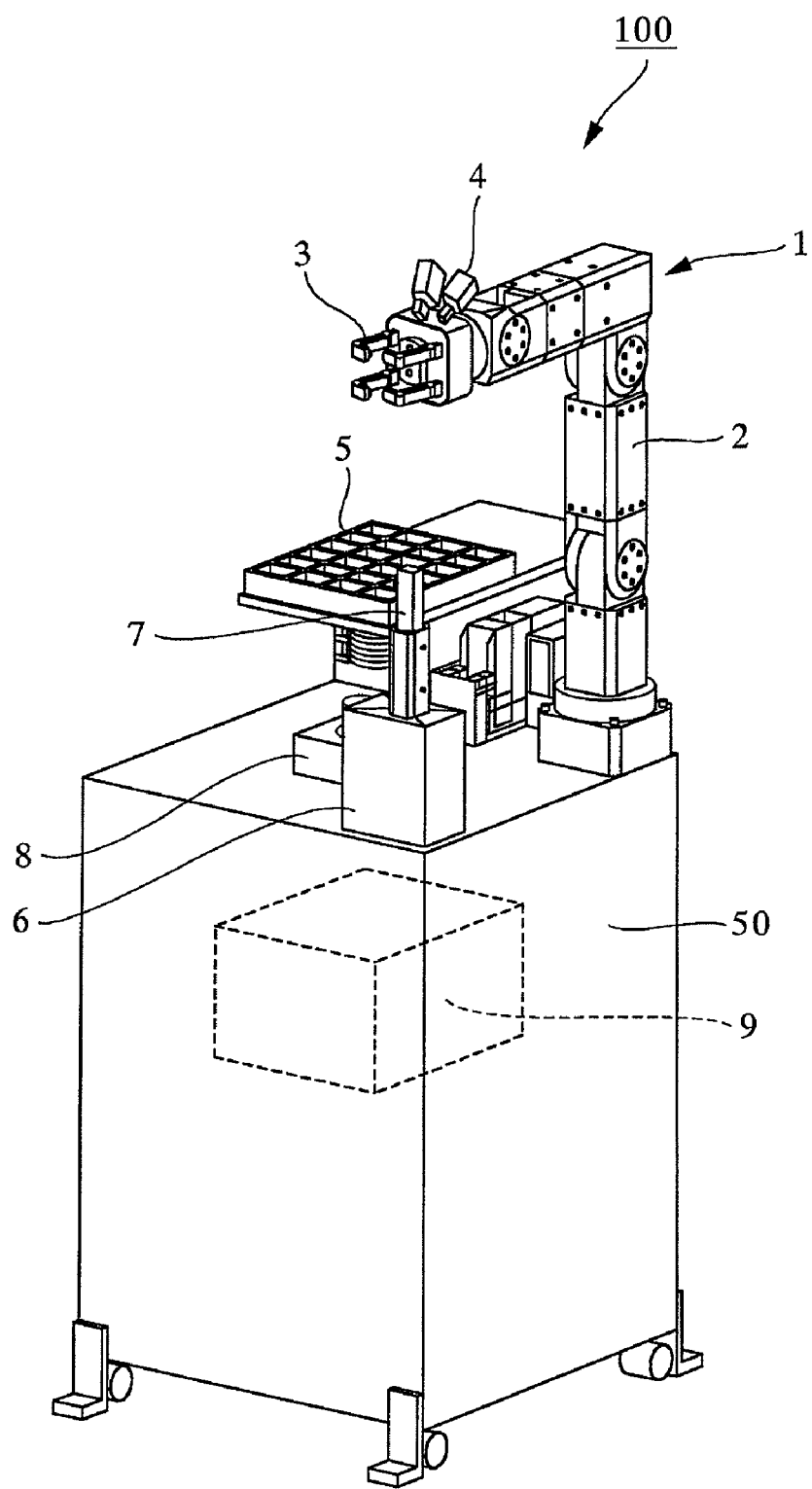
FIG. 1 is a perspective view illustrating a robot system according to a first embodiment of the present invention.

FIG. 1 is a perspective view illustrating a robot system according to a first embodiment of the present invention. As shown in FIG. 1, a robot system 100 includes a robot 1, a base 50 to which the robot 1 is fixed and which is a working area of the robot 1, and a tool 7 which is a gripping object. The robot system 100 is an assembling system in which the robot 1 performs an assembling operation by use of the tool 7. The robot 1 includes an articular arm 2 having six shafts, and a multifingered hand 3 which is a gripping apparatus provided at the tip of the arm 2 via a kinesthetic sensor (not shown). Moreover, to the tip of the arm 2, a small-sized camera 4 is attached. The base 50 is provided with a part supplier 5 for supplying parts to be assembled, and a tool table 6 on which the tool 7 for fastening small screws is disposed. Moreover, in the center of the base 50, a gripping jig 8 for use in assembling workpieces is provided. Above the base 50, there is disposed a camera (not shown) which detects positions of the workpieces and parts to be assembled. The arm 2 and the multifingered hand 3 of the robot 1 have operations controlled by a controller 9 disposed inside the base 50.

Figure 2A:
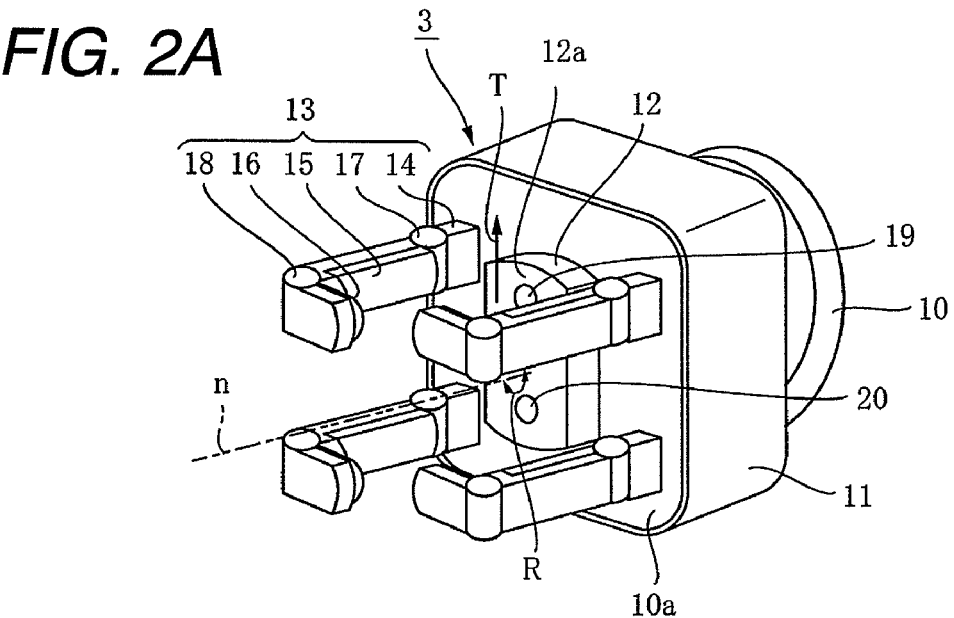
FIG. 2A is a perspective view of a multifingered hand according to the first embodiment of the present invention.
Figure 2B:
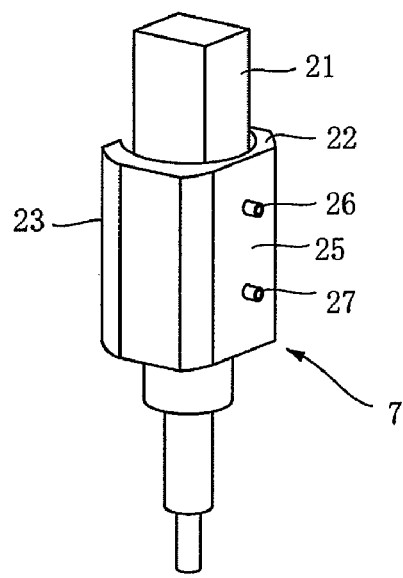
FIG. 2B is a perspective view of a tool according to the first embodiment of the present invention.
Figure 2C:
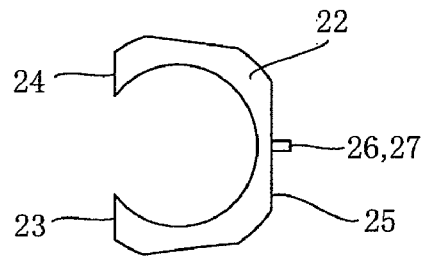
FIG. 2C is a top plan view of an attachment member of the tool according to the first embodiment of the present invention.

Next, the multifingered hand 3 will be described in detail. FIG. 2A to FIG. 2C are diagrams illustrating the multifingered hand 3 and the tool 7 according to the first embodiment of the present invention, FIG. 2A is a perspective view of the multifingered hand 3, FIG. 2B is a perspective view of the tool 7, and FIG. 2C is a top plan view of an attachment member 22 of the tool 7.

In FIG. 2A, the multifingered hand 3 has a housing 10 attached to the tip of the arm 2. Specifically, the rear surface of the housing 10 is attached to the tip of the arm 2. Moreover, the multifingered hand 3 includes a palm 12 provided on a front surface 10a of the housing 10, and a plurality of (in the present embodiment, four) fingers 13 which project outwardly from the front surface 10a of the housing 10 so as to surround the palm 12. The plurality of fingers 13 are arranged plane-symmetrically with respect to a virtual plane which is orthogonal to the front surface 10a. The housing 10 is provided with the kinesthetic sensor, an actuator, a driving circuit and the like (not shown). The housing 10 is covered with a cover 11.

Each of the fingers 13 includes a proximal knuckle 14, an intermediate knuckle 15, and a distal knuckle 16, and can bend inwardly at a joint 17 between the knuckles 14 and 15 and a joint 18 between the knuckles 15 and 16. Moreover, since the finger 13 bends at the joints 17 and 18, the intermediate knuckle 15 and the distal knuckle 16 of the finger 13 perform a function of a gripping portion. The palm 12 has a palm side contact surface (hereinafter referred to as "the contact surface") 12a which comes in contact with a gripping object side contact surface of the tool 7 as a gripping object as described later. The contact surface 12a is a flat surface. The contact surface 12a is precisely provided with a plurality of (in the present embodiment, two) holes 19 and 20.

Next, the tool 7 will be described in detail. In FIG. 2B, the tool 7 includes a tool main body 21, and the attachment member 22 attached to the outer periphery of the tool main body 21. The tool main body 21 is an assembling tool such as an electric screwdriver or a dispenser for applying a liquid, and is necessary for an assembling operation using an assembling jig/tool.

The attachment member 22 has contact surfaces 23 and 24 which come in contact with the distal knuckles 16 of the fingers 13 of the multifingered hand 3. Moreover, as shown in FIG. 2B and FIG. 2C, the attachment member 22 has a gripping object side contact surface (hereinafter referred to as "the contact surface") 25 which comes in contact with the contact surface 12a of the multifingered hand 3. The contact surface 25 is a flat surface. In the first embodiment, the tool main body 21 has a substantially rod-like shape, and the attachment member 22 is formed into a substantially C-shaped section which covers the tool main body 21, and is fixed to the tool main body 21 owing to spring properties of the attachment member 22. It is to be noted that a fixing method of the attachment member 22 is not limited to this example, and any fixing method such as a method of fixing the member by use of an adhesive and screws can be applied.

The contact surface 25 is provided with a plurality of (two) projections 26 and 27 which can detachably be inserted into the two holes 19 and 20 provided in the contact surface 12a of the palm 12 of the multifingered hand 3. Moreover, in the first embodiment, the projection 26 is provided precisely so as to be detachably inserted into the hole 19, and the projection 27 is provided precisely so as to be detachably inserted into the hole 20. That is, in the first embodiment, the number of the projections is the same as the number of the holes, so that each of the projections is inserted into the corresponding hole. The projections 26 and 27 are formed into a round shape as seen from a planar view, and the holes 19 and 20 are formed into a round shape as seen from the planar view so that the projections 26 and 27 can detachably be inserted into the holes.

A step where the multifingered hand 3 having the above constitution grips the tool 7 will be described. The multifingered hand 3 provided at the tip of the arm 2 comes close to the tool 7 by a moving operation of the arm 2, whereby the projections 26 and 27 provided on the contact surface 25 of the tool 7 are inserted into the two holes 19 and 20 provided in the contact surface 12a of the multifingered hand 3. Since the two projections 26 and 27 are inserted into the two holes 19 and 20, respectively, the moving of the tool 7 in a tangential direction T of the contact surface 12a is regulated, and the moving of the tool 7 in a rotational direction R around a normal line n of the contact surface 12a which is a rotary shaft center is also regulated. In consequence, the tool 7 is positioned in the tangential direction T of the contact surface 12a, and the tool 7 is also positioned in the rotational direction R around the normal line n of the contact surface 12a which is the rotary shaft center. Moreover, the moving operation of the arm 2 is performed until the contact surface 12a of the multifingered hand 3 comes in contact with the contact surface 25 of the tool 7.

After the inserting operation is completed, the joints 17 and 18 of each of the fingers 13 of the multifingered hand 3 are driven, and the distal knuckles 16 of the multifingered hand 3 are brought into contact with the contact surfaces 23 and 24 of the attachment member 22 of the tool 7. In consequence, the fingers 13 of the multifingered hand 3 grips the tool 7 so as to embrace the tool. At this time, since the contact surface 25 of the tool 7 is pressed onto the contact surface 12a of the multifingered hand 3, a gripping force can mutually be received by the contact surfaces 25 and 12a. In the above step, when the tool 7 is gripped by the multifingered hand 3, the tool 7 can securely be gripped. This improves a reproduction precision of the positioning of the tool 7 gripped by the multifingered hand 3, and the tool 7 can precisely be positioned. Therefore, an operation such as the assembling operation by the robot 1 using the tool 7 can securely be performed.

Here, the two holes 19 and 20 provided in the multifingered hand 3 have an inner diameter φ8 (a tolerance+0.015 mm to 0.000 mm), and the projections 26 and 27 of the tool 7 have an outer diameter φ8 (a tolerance−0.005 mm to −0.014 mm). Moreover, a center distance between the two holes 19 and 20 of the multifingered hand 3 is 30 mm. In this case, a tilt of the tool 7 can be suppressed to be from 0.0095° to 0.0554°. When a length of the tool up to the tip position of the tool main body 21 is 150 mm, a fluctuation of the tip position of the tool main body 21 can be suppressed to be from 0.025 mm to 0.145 mm.

Moreover, a positional error in a stretching direction parallel to a line connecting the two holes 19 and 20 of the multifingered hand 3 to each other is a value of a fitting play, and hence the error can be from 0.005 mm to 0.029 mm. Therefore, even when the multifingered hand 3 repeatedly grips the tool 7, the above precision fluctuation can be suppressed, whereby the assembling operation can securely be performed.

Furthermore, when the projections 26 and 27 of the tool 7 are inserted into the holes 19 and 20 provided in the multifingered hand 3 and the multifingered hand 3 comes in contact with the tool 7 to grip the tool, the multifingered hand 3 is operated so as to press the projections 26 and 27 into the holes 19 and 20 on one side. At this time, the multifingered hand 3 is operated in two directions, i.e., the stretching direction parallel to the line connecting the hole 19 to the hole 20 and an orthogonal direction which is orthogonal to the stretching direction, whereby the play among the projections 26 and 27 and the holes 19 and 20 is cancelled. Therefore, when the multifingered hand 3 repeatedly grips the tool 7, the fluctuation of the tip position of the tool main body 21 can be suppressed, and the reproduction precision can be improved. In consequence, the assembling operation can more securely be performed. It is to be noted that when the multifingered hand 3 is operated so as to press the projections 26 and 27 into the holes 19 and 20 on one side, the projections are pressed with a predetermined force under known impedance control using the kinesthetic sensor disposed in the multifingered hand 3. Therefore, the reproduction precision can further be stabilized.

As described above, in the first embodiment, when the projections 26 and 27 of the tool 7 are inserted into the holes 19 and 20 of the multifingered hand 3, the contact surfaces 12a and 25 are brought into contact with each other and then the fingers 13 of the hand 3 are bent to grip the tool, the tool 7 can three-dimensionally be positioned.

In consequence, the tool 7 can more precisely be positioned. Moreover, the positioning precision of the tip position of the tool 7 and the positioning reproduction precision thereof can further be improved. Moreover, when various tools are provided with the projections 26 and 27 in common, the tools 7 can be gripped by the multifingered hand 3 without complicating any structure. Furthermore, when the attachment member 22 is attached to the tool main body 21, the tool main body 21 does not have to be provided with any projection, but various tools can be gripped.

Second Embodiment

Figure 3A:
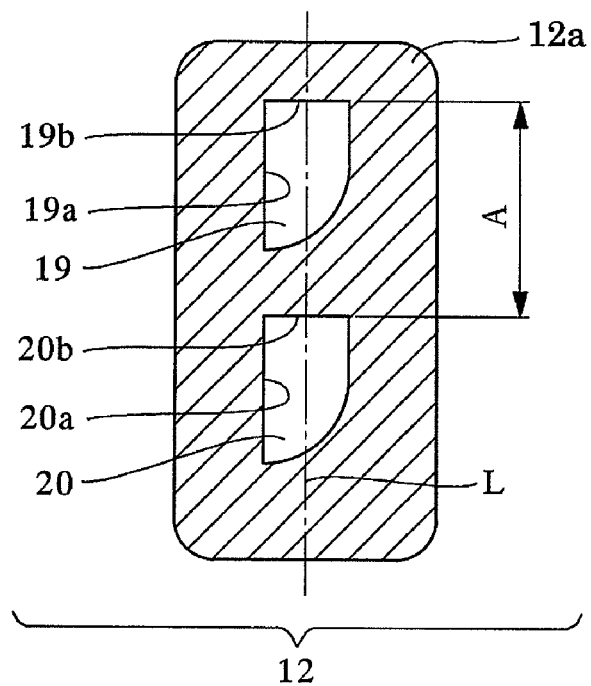
FIG. 3A is an exemplary diagram of a palm side contact surface of a palm of a gripping apparatus in a robot system according to a second embodiment of the present invention.
Figure 3B:
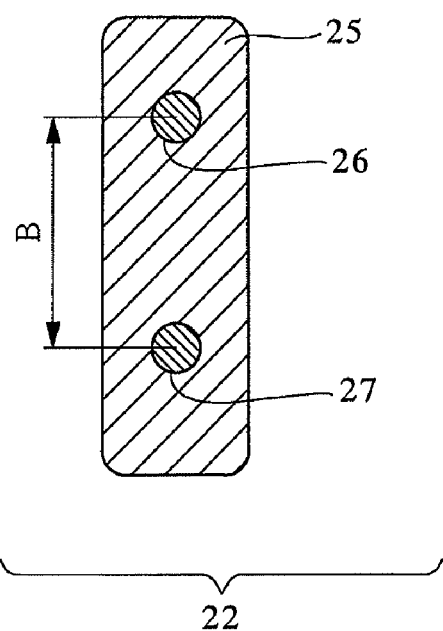
FIG. 3B is an exemplary diagram of a gripping object side contact surface of an attachment member of a tool in the robot system according to the second embodiment of the present invention.

Next, a robot system including a robot having a gripping apparatus according to a second embodiment of the present invention will be described. FIG. 3A and FIG. 3B are explanatory views illustrating a main part of the robot system according to the second embodiment of the present invention. FIG. 3A is an exemplary diagram of a palm side contact surface of a palm of the gripping apparatus, and FIG. 3B is an exemplary diagram of a gripping object side contact surface of an attachment member of a tool. It is to be noted that the whole constitution of the robot system is similar to the first embodiment, and is different from the first embodiment in a shape of a hole formed in the palm side contact surface of the palm.

As shown in FIG. 3A, a contact surface 12a of a palm 12 is provided with two holes 19 and 20, and as shown in FIG. 3B, a contact surface 25 of an attachment member 22 of a tool 7 is provided with two projections 26 and 27.

As shown in FIG. 3A, on a side wall of the hole 19, two reference surfaces 19a and 19b crossing each other at right angles are formed, and on a side wall of the hole 20, two reference surfaces 20a and 20b crossing each other at right angles are formed.

The parallel reference surface 19a or 20a which is one reference surface is provided in parallel with a line L connecting the hole 19 to the hole 20. The vertical reference surface 19b or 20b which is the other reference surface is provided perpendicularly to the line L connecting the hole 19 to the hole 20. A distance A between the vertical reference surfaces 19b and 20b is set to be slightly larger than a center distance B between the projections 26 and 27 provided on the contact surface 25 of the attachment member 22 of the tool 7.

Hereinafter, a gripping method in such a constitution will be described in detail with reference to FIG. 4A to FIG. 4D. In the same manner as in the first embodiment, as shown in FIG. 4A, an arm 2 is operated so that the projections 26 and 27 are inserted into the holes 19 and 20.

Then, in this inserted state, a multifingered hand 3 is operated in two directions, i.e., a stretching direction which is parallel to the line L connecting the hole 19 of the multifingered hand 3 to the hole 20 thereof and a direction which is perpendicular to the line L, and the projections 26 and 27 are attached onto reference surfaces of the holes 19 and 20 to position the tool 7 (a positioning step). This positioning step will be described in detail. First, as shown in FIG. 4B, the arm 2 is operated to attach the projections 26 and 27 of the tool 7 onto the parallel reference surfaces 19a and 20a of the holes 19 and 20 of the multifingered hand 3. Furthermore, as shown in FIG. 4C, the arm 2 is operated to attach the projection 26 of the tool 7 onto the vertical reference surface 19b of the hole 19 of the multifingered hand 3.

Next, when the tool 7 is positioned in the positioning step as shown in FIG. 4C, the contact surface 25 of the attachment member 22 of the tool 7 is pressed onto the contact surface 12a of the palm 12 with a plurality of fingers 13 to grip the tool 7 (a gripping step). At this time, joints 17 and 18 of the fingers 13 are driven, and distal knuckles 16 of the fingers 13 are brought into contact with contact surfaces 23 and 24 of the attachment member 22 of the tool 7 to grip the tool.

FIG. 4D is an exemplary sectional view illustrating a contact state between the contact surface 12a of the palm 12 of the multifingered hand 3 and the contact surface 25 of the attachment member 22 of the tool 7. The fingers 13 of the multifingered hand 3 grip the tool 7 so as to embrace the tool. Therefore, the tool 7 is gripped by pressing the contact surface 25 of the tool 7 onto the contact surface 12a of the palm 12. Consequently, a gripping force of the multifingered hand 3 can mutually be received by the contact surfaces 12a and 25. In consequence, when the multifingered hand 3 grips the tool 7, the tool is constantly positioned at the same position. When the multifingered hand 3 repeatedly grips the tool 7, it is possible to suppress a fluctuation of a tip position of a tool main body 21. This can improve a reproduction precision. In particular, since the reference surfaces 19a, 19b, 20a and 20b are provided, the tool can stably be positioned. Moreover, the holes 19 and 20 do not necessarily have to be formed with a strict dimensional precision so that the projections 26 and 27 are inserted into the holes. This can facilitate processing as well as the inserting operation.

Figure 5A:
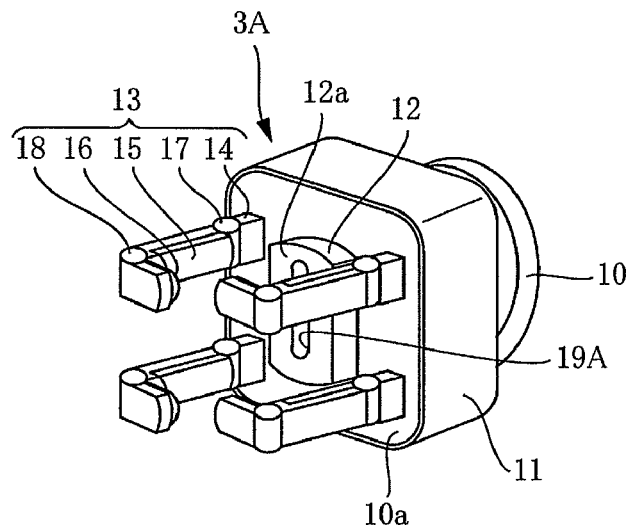
FIG. 5A is a perspective view of a multifingered hand having one hole according to another embodiment of the present invention.
Figure 5B:
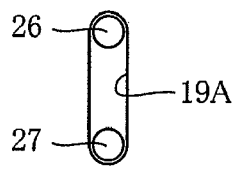
FIG. 5B is an exemplary diagram illustrating a state where two projections are inserted into one hole in a multifingered hand having the hole according to still another embodiment of the present invention.
Figure 5C:
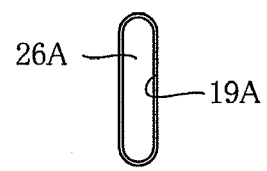
FIG. 5C is an exemplary diagram illustrating a state where one projection is inserted into one hole in a multifingered hand having the hole according to a further embodiment of the present invention.

It is to be noted that the present invention has been described with respect to the above embodiments, but the present invention is not limited to the embodiments. In the above embodiments, there has been described a case where two holes are provided in the palm side contact surface with respect to two projections, but one hole may be provided in the palm side contact surface with respect to the two projections. That is, as shown in FIG. 5A, when a hole 19A is formed into an oblong shape as seen from a planar view, as shown in FIG. 5B, two projections 26 and 27 having a round shape as seen from the planar view can detachably be inserted into the hole. Moreover, a gripping object can be positioned in a tangential direction of the contact surface 12a, and the gripping object can be positioned in a rotational direction around a normal line of the contact surface 12a which is a rotary shaft center. Moreover, as shown in FIG. 5C, one hole 19A may be provided in a palm side contact surface with respect to one projection 26A. In this case, the hole 19A has a shape other than the round shape as seen from the planar view, and the projection 26A can detachably be inserted into the hole 19A, thereby enabling positioning of a gripping object in a tangential direction of a palm side contact surface and positioning of the gripping object in a rotational direction around a normal line of the palm side contact surface which is a rotary shaft center. That is, in FIG. 5C, since the hole 19A has an oblong shape as seen from the planar view, the projection 26A has such an oblong shape as seen from the planar view that the projection can detachably be inserted into the hole 19A.

Figure 5D:
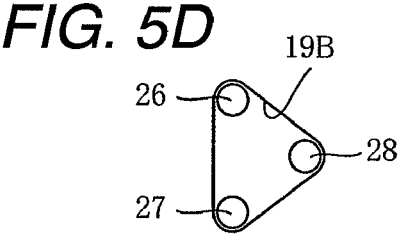
FIG. 5D is an exemplary diagram illustrating a state where three projections are inserted into one hole in a multifingered hand having the hole according to a further embodiment of the present invention.
Figure 5E:
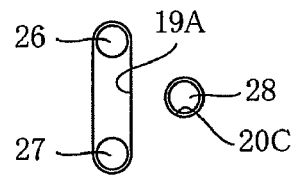
FIG. 5E is an exemplary diagram illustrating a state where three projections are inserted into two holes in a multifingered hand having the two holes according to a further embodiment of the present invention.
Figure 5F:
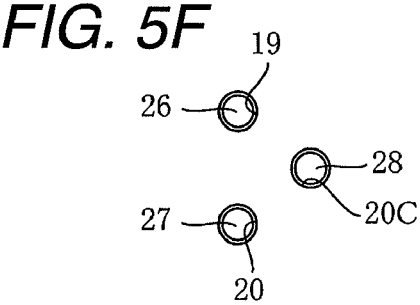
FIG. 5F is an exemplary diagram illustrating a state where three projections are inserted into three holes in a multifingered hand having the three holes according to a still further embodiment of the present invention.

Moreover, in the above embodiments, there has been described a case where two projections are inserted into two holes, but three or more projections may be inserted into one or a plurality of holes. For example, in the case of three projections, as shown in FIG. 5D, a palm side contact surface may be provided with a hole 19B for three projections 26, 27 and 28. Moreover, as shown in FIG. 5E, a palm side contact surface may be provided with two holes 19A and 20C for three projections 26, 27 and 28. Furthermore, as shown in FIG. 5F, three holes 19, 20 and 20C for three projections 26, 27 and 28 may be provided.

Furthermore, in the above embodiments, there has been described an example where the holes and projections have a round shape as seen from the planar view, but the present invention is not limited to these embodiments, and the holes and projections may be formed into any shape, as long as the projections can be inserted into the holes to position the gripping object.

Additionally, in the above embodiments, there has been described a case where the attachment member having the projections is attached to the tool main body, but the present invention can be applied to a case where the tool main body is provided with the projections.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-153682, filed Jul. 6, 2010, which is hereby incorporated by reference herein in its entirety.

What is claimed is:

1. A gripping apparatus which includes a palm and a plurality of fingers having joints to grip a tool with the palm and the plurality of fingers, comprising:

a palm side contact surface provided on the palm and brought into contact with a tool side contact surface of the tool; and holes provided in the palm side contact surface into which projections provided on the tool side contact surface of the tool can be inserted, wherein engagement of the projections in the holes determines a position of the tool in a tangential direction of the palm side contact surface and a position of the tool in a rotational direction around a normal line of the palm side contact surface which is a rotary shaft center.

2. The gripping apparatus according to claim 1, wherein on side walls of the holes, reference surfaces are formed onto which the projections are attached, to position the tool.

3. A robot system, comprising:
- a robot including a gripping apparatus, the gripping apparatus including a palm and a plurality of fingers having joints to grip tool with the palm and the plurality of fingers;
- a palm side contact surface provided on the palm and brought into contact with a tool side contact surface of the tool; and
- holes provided in the palm side contact surface into which projections provided on the tool side contact surface of the tool can be inserted, wherein
- engagement of the projections in the holes determines a position of the tool in a tangential direction of the palm side contact surface and a position of the tool in a rotational direction around a normal line of the palm side contact surface which is a rotary shaft center; and
- a tool having a tool main body to which an attachment member is attached,
- wherein the attachment member has the tool side contact surface provided with the projections and is brought into contact with the palm side contact surface of the gripping apparatus.

4. A gripping method in which a gripping apparatus including a palm having a palm side contact surface and a plurality of fingers having joints grips a tool, the palm side contact surface of the palm being provided with holes into which projections provided on a tool side contact surface of the tool are detachably inserted, the holes having reference surfaces formed on side walls thereof, the method comprising:
- a positioning step of inserting the projections into the holes and positioning the projections onto the reference surfaces to position the tool; and
- a gripping step of pressing the tool side contact surface of the tool onto the palm side contact surface of the palm with the plurality of fingers to grip the tool in a state where the tool is positioned in the positioning step.

5. The robot system according to claim 3, wherein the projections on the tool side contact surface are shaped to complement the holes in the palm side contact surface.

6. The robot system according to claim 3, wherein two holes are provided in the palm side contact surface and two projections are provided on the tool side contact surface.

* * * * *